US009992330B1

(12) United States Patent
Hodge

(10) Patent No.: US 9,992,330 B1
(45) Date of Patent: Jun. 5, 2018

(54) CONFERENCE FUNCTIONALITY BETWEEN INMATES AND MULTIPLE APPROVED PARTIES IN CONTROLLED ENVIRONMENT

(71) Applicant: **Global Tel*Link Corporation**, Reston, VA (US)

(72) Inventor: Stephen L. Hodge, Aubry, TX (US)

(73) Assignee: **Global Tel*Link Corporation**, Reston, VA (US)

( * ) Notice: Subject to any disclaimer, the term of this patent is extended or adjusted under 35 U.S.C. 154(b) by 0 days. days.

(21) Appl. No.: 15/607,048

(22) Filed: May 26, 2017

(51) Int. Cl.
| H04M 11/00 | (2006.01) |
| H04M 3/42 | (2006.01) |
| H04M 3/38 | (2006.01) |
| H04M 3/56 | (2006.01) |
| H04L 9/32 | (2006.01) |

(52) U.S. Cl.
CPC .......... *H04M 3/42068* (2013.01); *H04L 9/32* (2013.01); *H04M 3/382* (2013.01); *H04M 3/562* (2013.01)

(58) Field of Classification Search
None
See application file for complete search history.

(56) References Cited

U.S. PATENT DOCUMENTS

| 8,160,219 | B2 * | 4/2012 | Bayne | H04M 3/56 379/114.05 |
| 8,917,848 | B2 * | 12/2014 | Torgersrud | H04M 3/38 379/142.05 |
| 2013/0058469 | A1 * | 3/2013 | Gongaware | H04M 3/4211 379/93.03 |
| 2013/0194377 | A1 * | 8/2013 | Humphries | H04N 7/15 348/14.08 |

* cited by examiner

*Primary Examiner* — Stella Woo
(74) *Attorney, Agent, or Firm* — Sterne, Kessler, Goldstein & Fox P.L.L.C.

(57) ABSTRACT

A conference call management system and a method for operating the management system in a controlled environment are disclosed. The conference call management system includes a monitored conference device and a conference server. The monitored conference device receives authorization from the conference server to conduct conference calls within the controlled environment. The monitored conference device further receives a conference call application from the conference server that enables the monitored conference device to initiate and establish conference calls through the conference server. The conference call application allows a user of the monitored conference device to select outside parties to add to the conference call.

22 Claims, 9 Drawing Sheets

CONFERENCE FUNCTIONALITY BETWEEN INMATES AND MULTIPLE APPROVED PARTIES IN CONTROLLED ENVIRONMENT

BACKGROUND

Field

This disclosure relates to providing conference functionality in a controlled environment between inmates within the controlled environment and multiple approved parties outside, of the controlled environment.

Background

While inmates within a controlled environment are typically allowed to engage in communications with a person outside of the controlled environment, such communications are limited to a single person. Due to security and implementation restrictions within the controlled environment, inmates are typically prevented from engaging in conference calls with two or more people outside of the controlled environment. Accordingly, prior art communication systems of controlled environments lack conference functionality; inmates have no options for communications that include more than one party outside of the controlled environment.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of ti e disclosure and to enable a person skilled in the pertinent art to make and use the embodiments.

Figure 1:
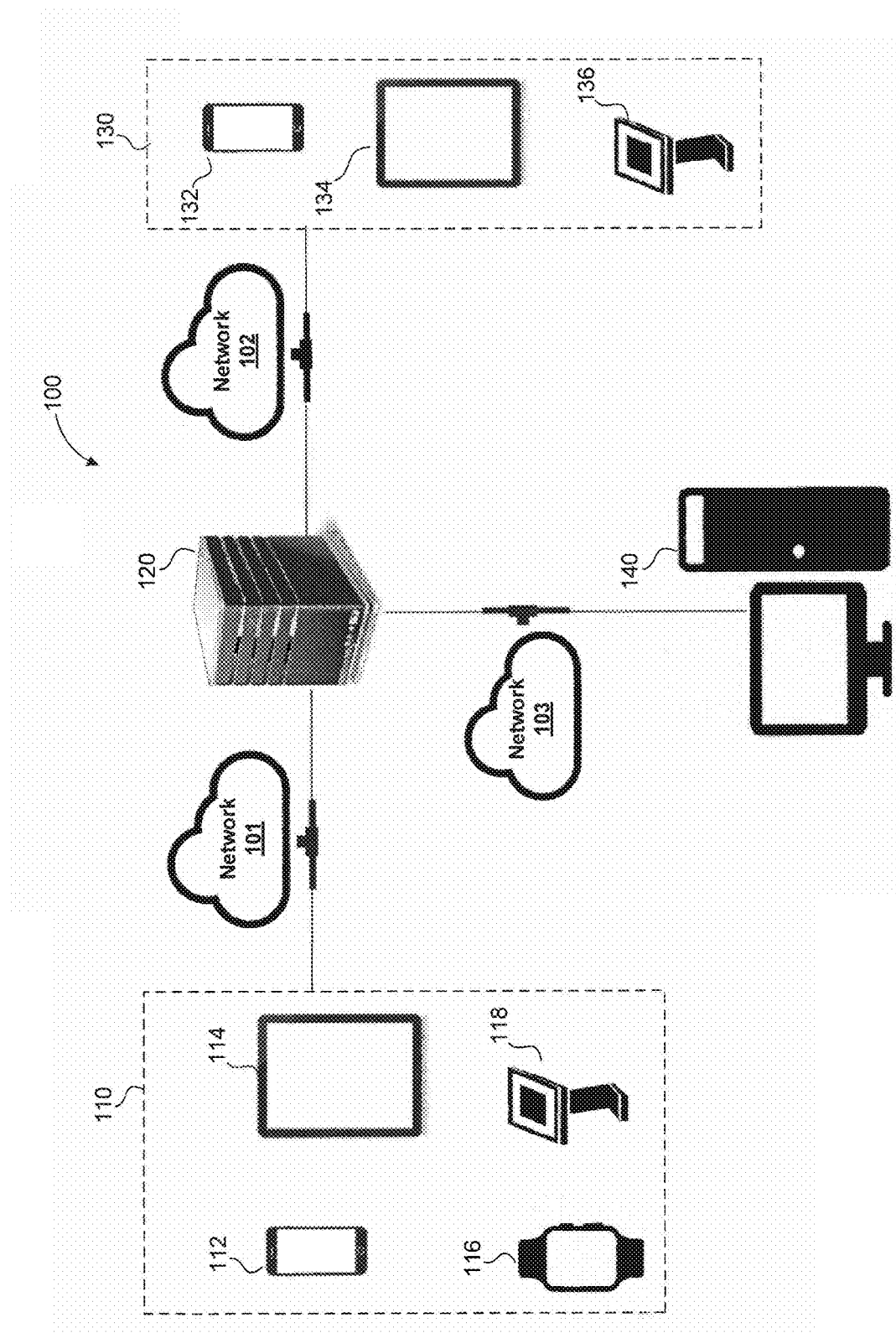
FIG. 1 illustrates a block diagram of an exemplary conference call management system, according to embodiments of the present disclosure.

The present disclosure will be described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the Detailed Description is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc. Further, any of the implementation variations may be carried out by a general purpose computer, as described below.

For purposes of this discussion, any reference to the term "module" shall be understood to include at least one of software, firmware, and hardware (such as one or more circuit, microchip, or device, or any combination thereof), and any combination thereof. In addition, it will be understood that each module may include one, or more than one, component within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired or wireless manner.

The following Detailed Description of the exemplary embodiments will so fully reveal the general nature of the disclosure that others can, by applying knowledge of those skilled in relevant art(s), readily modify and/or customize for various applications such exemplary embodiments, without undue experimentation, without departing from the spirit and scope of the disclosure. Therefore, such modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Exemplar Conference Call Management System

FIG. 1 illustrates a block diagram of an exemplary conference call management system 100, according to embodiments of the present disclosure. Conference call management system 100 can be implemented in a controlled environment, such as a prison. In some embodiments, conference call management system includes monitored conference devices 110, conference server 120, outside conference devices 130, and monitoring, system 140. Monitored conference devices 110 are connected to conference server 120 through network 101. Outside conference devices 130 are connected to conference server 120 through network 102. Conference server 120 acts as an intermediary through network 101 and network 102 between monitored conference devices 110 and outside conference devices 130. Conference server 120 is connected to monitoring system 140 through network 103. In another embodiment, monitoring system 140 is integrated into conference server 120. Conference sessions between monitored conference devices 110 and outside conference devices 130 include telephone sessions and video conference sessions.

Networks 101, 102, and 103 may include any or all of a Local-Area Network (LAN), a Wide-Area Network (WAN), or the Internet, depending on the location of conference server 120 in relation to monitored conference devices 110 and monitoring system 140. For example, network 101 is implemented as a LAN when conference server 120 is co-located with monitored conference devices 110. In another example, network 101 is implemented as a WAN or the Internet when conference server 120 is located remotely from monitored conference devices 110. In some embodiments, conference server 120 is cloud-based and includes one or more cloud-based servers. In some embodiments, conference server 120 is a server within a data center that supports the wireless devices within the controlled environment. Similarly, network 103 can be implemented as either a LAN or WAN depending on the positional relationship between conference server 120 and monitoring system 140. Because outside conference devices 130 are typically outside of the controlled environment, network 102 can be implemented as a WAN or the Internet because conference server 120 will be located remotely from outside conference devices 130.

Conference call management system 100 provides management of monitored conference devices 110, such as a smartphone 112, a tablet 114, a wearable device 116, and a conference kiosk 118. A controlled environment can distribute and/or provide monitored conference devices 110 to its inmates. Monitored conference devices 110 are devices operated by inmates within a controlled environment and can be remotely managed and updated by conference server 120. As they are generally under the supervision of the controlled environment, monitored conference devices 110 include administrative software that enable, administrators to remotely access and configure monitored conference devices 110. In order to implement the conference functionality described herein, monitored conference devices 110 further include specialized software that enable monitored conference devices 110 to establish conference session preferences (e.g., conference contacts) as well as initiate and conduct conference sessions through conference server 120 and subject to any restrictions and/or conditions enforced by conference server 120 and/or monitoring system 140 which will be discussed further herein. In some embodiments, monitored conference devices 110 can connect to network 101 through wireless connections, such as Bluetooth™ or IEEE 802.11 (commonly known as Wi-Fi). Monitored conference devices 110 can connect to network 101 through one or more access points (not shown) that are installed in controlled environment which provide network access between monitored conference devices 110 and conference server 120. The access point can be implemented as any device that provides network access such as, but not limited to, a router, a modem, smartphone, a tablet, or a laptop device.

In some embodiments, conference server 120 acts as an intermediary in a conference session between monitored conference devices 110 and outside conference devices 130. Conference server 120 manages conference information for inmates within the controlled environment, receives requests for conference sessions and establishes conference sessions. Conference server 120 further manages conference profiles established for each inmate of the controlled environment and enforces any restrictions or conditions associated with the inmates and/or conference sessions. In some embodiments, conference server 120 also records and monitors conference sessions. In some embodiments, conference server 120 records conference sessions and provides the recorded conference sessions to monitoring system 140 for further monitoring.

In some embodiments, outside conference devices 130 are devices that are operated by participants that are outside of the controlled environment and include at least one of outside conference phone 132, outside conference tablet 134, and outside conference kiosk 136. In an embodiment, outside conference devices 130 may be located within the controlled environment, such as in a designated area or room of the controlled environment. Accordingly, devices can be considered outside of the controlled environment when they are operated by participants who are not incarcerated or otherwise detained within the controlled environment and/or not directly managed or controlled by the controlled environment. In another embodiment, outside conference devices 130 may be located outside of the controlled environment such as in the outsider's home. Outside conference devices 130 connect to conference server 120 via network 102, which may include any or all of a WAN, the Internet, and/or a Public Switched Telephone Network (PSTN). The WAN may facilitate communications with other nearby prisons, such as those within the same county, state, etc.

In some embodiments, monitoring system 140 monitors conference sessions between monitored conference devices 110 and outside conference devices 130. Monitoring system 140 can perform video analysis on conference sessions to ensure that participants in the conference session are behaving consistent with guidelines established by the controlled environment. For example, monitoring system 140 can detect within conference sessions whether participants are discussing illegal activities or are having lewd conversations.

Monitoring system 140 can monitor conferences automatically (e.g., on every conference session) and/or manually (e.g., initiated by an administrator of the controlled environment or by authorized personnel). Additionally, monitoring system 140 can monitor conference sessions in real-time (e.g., as conference sessions are on-going) and/or on a delayed basis (e.g., on recorded conference sessions). In some embodiments, monitoring system 140 can be located remotely from conference server 120 and conference sessions can be stored on conference server 120 which can then later provide the recorded conference sessions to monitoring system 140 for analysis. Conference server 120 can also stream on-going conference sessions to monitoring system 140 over network 103 so that monitoring system 140 can remotely perform real-time analysis on conference sessions. Monitoring system 140 can further be configured to communicate with conference server 120 to indicate approval of starting, sending, or receiving a conference session.

In some embodiments, monitoring, system 140 is integrated into conference server 120 and can monitor in real-time on-going conference communications. Monitoring system 140 can receive information related to all conference sessions that take place between monitored conference devices 110 and outside conference devices 130 in conference call management system 100 through conference server 120.

In some embodiments, monitoring conference sessions includes detecting and/or analyzing characteristics, of conference sessions which include but are not limited to an audio stream of a conference session, a video stream of a conference session, and actions performed by the participants during a conference session. Actions include words spoken by participants and physical actions of participants (e.g., during a video conference session). Detected prohibited actions can trigger monitoring system 140 to perform a predetermined action such as terminating the conference session, provide a warning to the participants of the conference session, a d/or provide an alert of the detected prohibited action to the appropriate administrators.

Exemplary Conference Server

Figure 2:
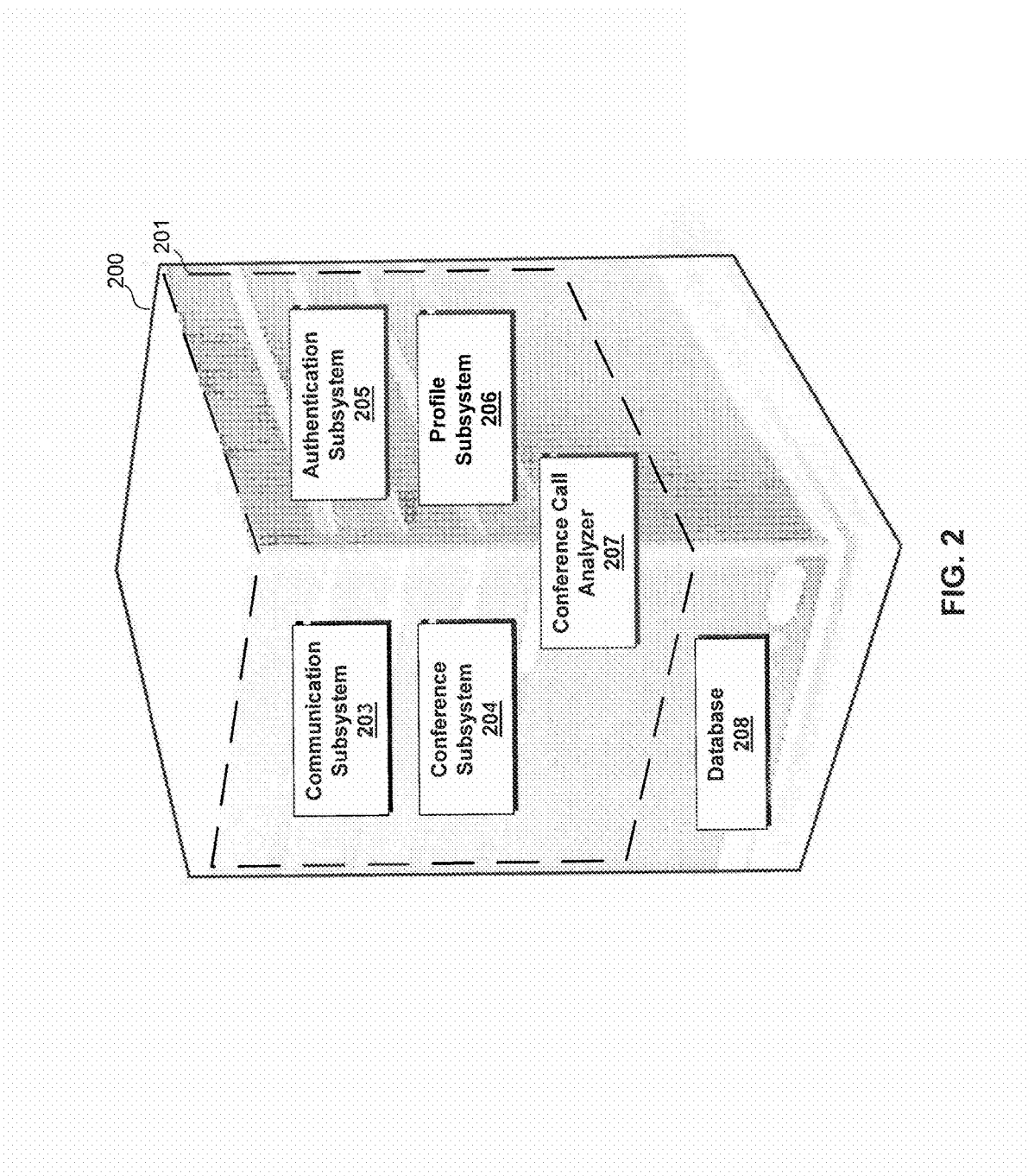
FIG. 2 illustrates an exemplary server for use in the exemplary conference call management system of FIG. 1, according to embodiments of the present disclosure.

FIG. 2 illustrates a block diagram of conference server 200, according to embodiments of the present disclosure. In an embodiment, conference server 200 represents an exemplary embodiment of conference server 120 of FIG. 1. Conference server 200 includes but is not limited to processing subsystem 201 and database 208. Processing subsystem 201 includes one or more processors, computers, or servers identified as subsystems and can be constructed as individual physical hardware devices, or as virtual devices, such as a virtual server. The number of processing subsystems can be scaled to match the number of simultaneous user connections desired to be supported by a conference call management system such as conference call management system 100 of FIG. 1. Processing subsystem 210 includes but is not limited to communication subsystem 203, conference subsystem 204, authentication subsystem 205, profile subsystem 206, and conference call analyzer 207.

In some embodiments, communication subsystem 203 controls the routing of communications related to conferences between monitored conference devices 110, outside conference devices 130, and monitoring system 140. Communication subsystem 203 can perform switching required to electrically connect monitored conference devices 110 within the controlled environment with outside conference devices 130. Communication subsystem 203 can communicate with monitoring system 140 and transmit ongoing or stored conference sessions to monitoring system 140. Communication subsystem 203 can further record conference sessions including metadata associated with the conference sessions such as time of sessions and participants involved in the conference sessions. Communication subsystem 203 can automatically or by request transmit recorded conference sessions to monitoring system 140 for analysis.

In some embodiments, conference subsystem 204 controls the establishment of conference calls within conference call management system 100. Conference, subsystem 204 performs functions related to managing conference call requests from monitored conference devices 110 and outside conference devices 130, managing requests from monitored conference devices 110 to manage conference PAN lists, and managing ongoing conference calls. Managing conference call requests can include receiving requests from monitored conference devices 110, receiving requests from outside conference devices 130, and performing the appropriate processing to determine whether to establish the requested conference call. Processing the requests can include routing the request to authentication subsystem 205 to determine whether the inmate involved in the request is authorized to initiate or otherwise participate in the conference call. Conference PAN lists include identifiers of outside contacts that the inmate may include in a conference call. Contacts who participate in a conference call may be considered participants and are identified by an identifier. Contacts who are not incarcerated within the controlled environment can be considered an outside party of the conference call.

In some embodiments, conference subsystem 204 can also work in conjunction with profile subsystem 206 to manage requests from inmates to manage their conference PAN lists. As discussed above, a conference PAN list can be considered a subset of an inmate's global PAN list. In some embodiments, adding contacts to the conference PAN list requires additional confirmation by conference subsystem 204 that is separate from adding contacts to the global PAN list. For example, an inmate may submit a first request to add a contact to the global PAN list and may be required to submit a second request to add a contact to the conference PAN list. Conference subsystem 204 can process the requests based on separate administrative rules established by the controlled environment. As one non-limiting example, if the contact is the inmate's attorney, an administrative rule may allow attorneys to be added to the global PAN list but another administrative rule may prevent attorneys from being added to the conference PAN list. In some embodiments, an inmate's conference PAN list and global PAN list can be associated with the inmate's profile and stored in database 208.

In some embodiments, conference subsystem 204 also manages ongoing conference calls. Conference subsystem 204 can receive requests from participants of an ongoing conference call to add another participant to the call, to initiate video capability to the conference call (e.g., if the conference call was initially set up as a telephonic conference call), to terminate video capability to the conference call (e.g., if the conference call was initially set up as a video conference call), and to manage other properties of the ongoing conference call.

Conference subsystem 204 can monitor ongoing conference calls for requests transmitted by a device within the ongoing conference calls. Conference subsystem 204 can parse the requests and determine the appropriate action to take based on the information in the requests. Requests may include properties of the ongoing conference call including the participants, the type of conference call (e.g., video or telephonic), and ending the conference call with respect to one or more of the participants. Conference subsystem 204 can also load establish conference calls based on preferences established by the inmate within the controlled environment. For example, conference subsystem 204 may retrieve the preferences from the inmate's profile retrieved through profile subsystem 206. Moreover, conference server 200 may also receive an instruction from monitoring system 140 to terminate a conference call.

Conference subsystem 204 can also track monitored conference devices within the controlled environment. In some embodiments, conference subsystem 204 tracks all monitored conference devices currently active in a network of controlled environment as well as the inmates that have signed into each monitored conference device. For example, conference subsystem 204 can associate the network information (e.g., IP address, MAC address, device identifier) of the monitored conference device with inmate information (e.g., inmate identifier, inmate user name).

In some embodiments, authentication subsystem 205 performs authentication functions for establishing conference calls within conference call management system 100. Authentication subsystem 205 receives authentication information from inmates and outside participants to the conference call. Authentication information can include but is not limited to at least one of a username and password data, challenge questions, challenge answers, biometric data, device data such as make and model of a communication device, and/or location data. Biometric data includes one or more of a finger print, a hand print, a voice sample, an iris or retinal sample, a facial image of the user (2D or 3D), a gait identification, a hand geometry, a signature identification, an infrared camera identification, or any other biometric as deemed appropriate. Authentication subsystem 205 further assists in establishing a secure communication between monitored conference devices 110 and conference server 200.

In some embodiments, profile subsystem 206 receives and implements preferences from inmates regarding conference functionality including but not limited to managing outside contacts on a conference personal allowed number (PAN) list. In some embodiments, the conference PAN list is a subset of the inmate's global PAN list and is subject to any administrative restrictions of the controlled environment. In other words, not every contact on global PAN list will be allowed to on the conference PAN list. For example, the controlled environment may restrict attorneys from being involved in conference calls due to security and confidentiality concerns. Accordingly, the controlled environment may generate an administrative rule that prevents any outside contacts identified as attorneys from being added to an inmate's conference PAN list. Another example of an administrative rule can include requiring confirmation from the outside contact and/or an authorized party of the controlled environment.

Review of requests to add outside contacts to a conference PAN list of an inmate's profile can be automated (e.g., subject to administrative rules) and/or manually done by an authorized party. Administrative rules can further specify permissible or restricted actions that can be performed by inmates of the controlled environment as related to a conference call. In this manner, administrative rules can be inmate-specific or global (i.e., apply to all inmates of the controlled environment). For example, administrative rules can reference whitelists or blacklists that include identifiers of contacts. A whitelist can be global, specific to the inmate, or specific to a group of inmates and can include identifiers of contacts that are allowed to be added to a conference PAN list. A blacklist can be global, specific to the inmate, or specific to the group of inmates and can include identifiers of contacts that are not allowed to be added to a conference PAN list. Discussion of administrative rules is merely exemplary and other administrative rules are within the scope of the invention. Additionally, administrative rules can specify permissible and/or restricted actions that apply to specific monitored conference devices, specific types of monitored conference devices (e.g., all tablets, all smart phones), or all monitored conference devices. For example, an administrative rule to a specific type of monitored conference device can be a restriction on certain content from being downloaded onto all generic smartphones.

In some embodiments, profile subsystem 206 works in conjunction with conference call analyzer 207 to implement administrative rules. Conference call analyzer 207 monitors and analyzes on-going or recorded conference calls (e.g., stored in database 208) and provide alerts based on the monitoring. Monitoring includes performing visual analysis on video conference calls and audio analysis on video and audio conference calls. Monitoring can be performed in real-time with on-going conference calls or on stored conference calls. Visual analysis can include performing object identification and biometric analysis of the participants in the conference call. Object identification includes analyzing video frames to determine objects present during the video conference call. Biometric analysis includes analyzing facial, retinal, and other visual features of participants in the video conference call to determine identities of all participants. Conference call analyzer 207 can coordinate with administrative rules to perform predetermined actions based on the visual analysis. For example, an administrative rule may trigger a notification when a determined identity of a participant does not match with an identifier of the participant that was used to establish the conference call. The trigger can be sent to an administrator who can confirm or deny the results of the analysis.

Audio analysis of video and audio conference calls includes voice analysis and content analysis of the conversations taking place during the conference call. Voice analysis includes comparing voices detected during the conference call with voices expected to be heard on the call based on, for example, an identifier of the participant that was used to establish the conference call. Content analysis includes detecting and transcribing the words spoken by all participants during the conference call and performing any predetermined actions as determined by associated administrative rules. For example, an administrative rule may trigger a notification when certain phrases or words are detected during the conference call.

In some embodiments, the functionality of conference call analyzer 207 can be implemented in monitoring system 140.

Database 208 includes any number of databases and/or servers, and stores and organizes data in a relational database. Database 208 runs a database management system, such as MYSQL™, to provide an example. Database 208 stores inmate-specific information regarding the content associated with each inmate and subject to administrative rules associated with the inmate, the monitored conference device to which the inmate has signed in, and/or the specific content. Database 208 further stores administrative rules that are utilized by conference server 200 and monitoring system 104 to monitor and manage conference calls within the controlled environment. As previously discussed, administrative rules can be apply to inmates as an inmate specific rule or a global rule, to devices as a device specific rule, a device type rule, or a global rule, and to content as a content specific rule, a content type rule, and a global rule. Administrative inmate rules can be associated with an inmate (or inmates) and either allow or restrict access to conference call functionality based on the identity of the inmate. Examples of administrative inmate rules include but are not limited to restricting or limiting the inmate's access to conference call functionality, restricting or limiting contacts that can be added to the inmate' conference PAN list, and restricting or limiting a conference call (e.g., time restriction).

Database 208 further stores all conference calls that occur within conference call management system 100. The stored conference calls may be later analyzed or provided to a monitoring system, such as monitoring system 140, for later analysis. Database 208 also includes biometric and authentication information of all inmates within the controlled environment. Moreover, database 208 can also include biometric information of any outside party approved to participate in the conference call functionality within the controlled environment.

Exemplary Monitored Conference Device

Figure 3:
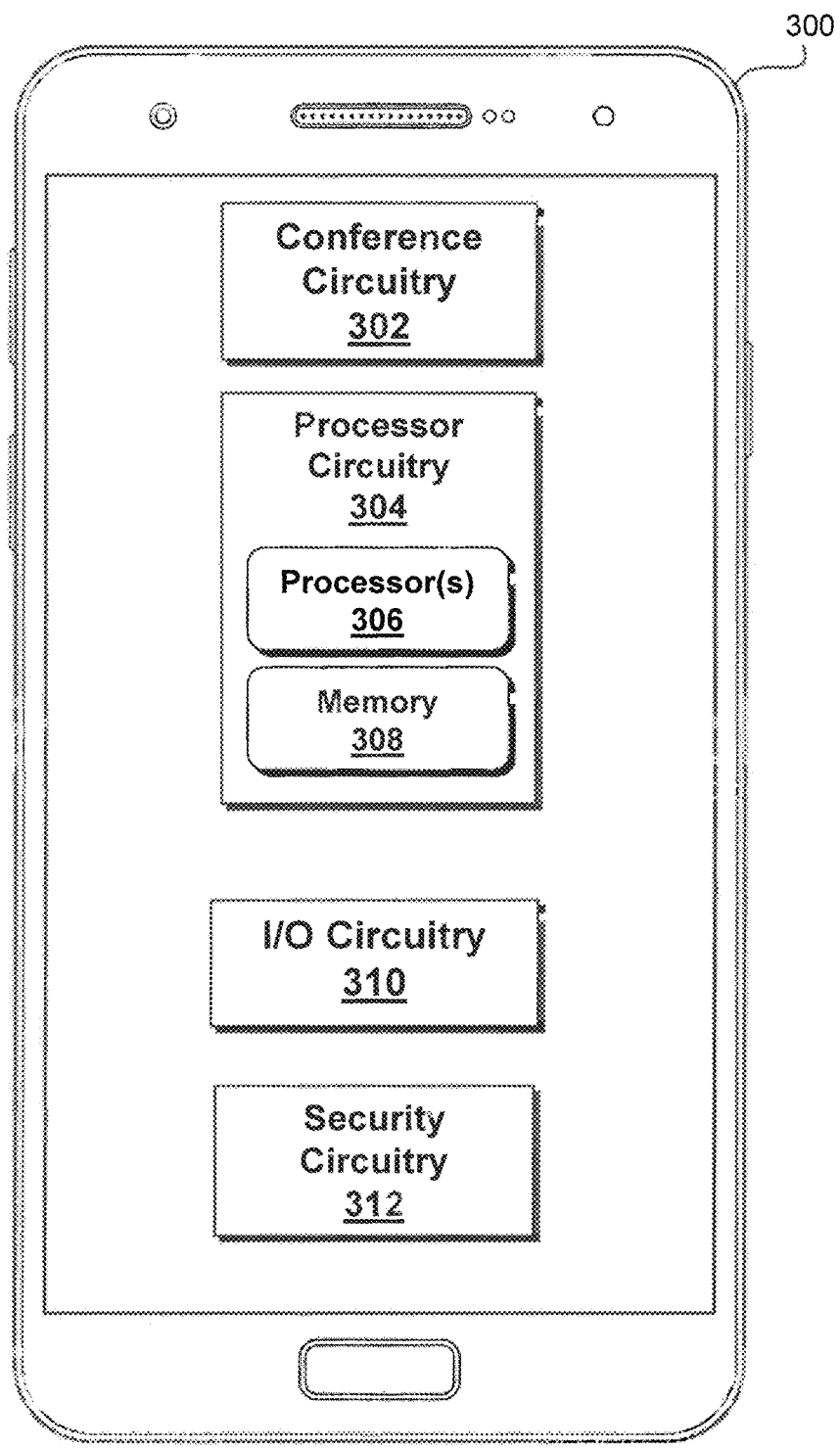
FIG. 3 illustrates a block diagram of an exemplary monitored conference device for use in, the exemplary conference call management system of FIG. 1, according to embodiments of the present disclosure.

FIG. 3 illustrates a block diagram of an exemplary monitored conference device 300 for use in the exemplary conference call management system 100 of FIG. 1, according to embodiments of the present disclosure. Monitored conference device 300 represents an exemplary embodiment of monitored conference device 110 such as smartphone 112, tablet 114, wearable device 116, and conference kiosk 118, as described in FIG. 1. In some embodiments, monitored conference device 300 includes conference circuitry 302, processor circuitry 304, input/output circuitry 310, and security circuitry 312.

Conference circuitry 302 controls conference functionality of monitored conference device 300 including transmitting requests to conference server 200 for conference functionality (e.g., a conference call application) to be added to monitored conference device 300, for adding outside contacts to a conference PAN list, and to initiate a conference call with two or more outside contacts as identified by the inmate's conference PAN list. Conference circuitry 302 receives instructions from conference server 200 including a conference call application to be installed on monitored conference device 300. In some embodiments, conference call functionality is implemented on monitored conference device through the conference call application, which is provided by conference server 200 upon approval of the inmate and/or monitored conference device 300.

In some embodiments, conference circuitry executes the conference call application which provides features associated with the conference call functionality. In other words, prior to installation of the conference call application, monitored conference device 300 is not permitted to conduct conference calls within the controlled environment. When the conference call application is installed, monitored conference device 300 has access to permitted features of a conference call including submitting requests and managing conference PAN lists.

In some embodiments, conference circuitry 302 manages inmate information such as an inmate profile related to conference calls. Inmate information can include information regarding conference call preferences associated with the inmate, administrative rules governing the inmate's use of conference call functionality (e.g., rules that control conference call functionality through monitored conference device 300), and settings associated with monitored conference device 300. Conference call functionality includes the ability to initiate conference calls and manage conference PAN lists through monitored conference device 300. As a non-limiting example, conference call management can specify that the inmate currently using monitored conference device 300 has access to only certain features of conference call functionality. An administrative rule can specify features of the conference call management system 100 to which the inmate has access such as but not limited to: the inmate can only include certain contacts within a conference call (e.g., a conference PAN list), the inmate can only conduct conference calls during specific times, and the inmate can only conduct conference calls of a predetermined length or with a predetermined device.

Processor circuitry 304 includes one or more processors 306 and memory 308. The number of processors 306 can be scaled to match the number of simultaneous user connections desired to be supported by a conference call management system such as conference call management system 100 of FIG. 1. Processors 306 control the operation of monitored conference device 300 and its components. In some embodiments, memory 308 can be any well-known volatile and/or non-volatile memory that is removable and/or non-removable. Memory 308 can store inmate preferences, inmate profiles, and inmate conference PAN lists, which includes information regarding monitored conference device 300.

In some embodiments, input/output circuitry 310 includes one or more transceivers, transmitters, and/or receivers that communicate via a wireless interface, such as through one or more antennas. For example, input/output circuitry 310 includes a component, such as a Bluetooth transceiver, that enables Bluetooth communication between monitored conference device 300 and an external device that also has Bluetooth capability, such as an access point or another monitored conference device 300 such as a smartphone, a tablet, or wireless accessories such as a wireless headset. In an embodiment, input/output circuitry 310 is configured to transmit and receive communications between monitored conference device 300 and conference server 200 via network 101. In an embodiment, input/output circuitry 310 connects monitored conference device 300 with other devices such as a mobile device, a kiosk, an access point, a beacon, and/or external input devices such as a keyboard, mouse, camera, or touch interface.

In some embodiments, security circuitry 312 coordinates security of monitored conference device 300 by authenticating users and by communicating authentication information with conference server 120. Security circuitry 312 can authenticate users of monitored conference device 300 utilizing identity data of inmates. Identity data includes but is not limited to at least one of a username and password data, challenge questions, challenge answers, biometric data, device data such as make and model of a communication device, and/or location data. Biometric data includes one or more of a finger print, a hand print, a voice sample, an iris or retinal sample, an image of the user (2D or 3D), a hand geometry, a signature identification, an infrared camera identification, or any other biometric as deemed appropriate. The challenge question form of identity data may be a series of challenge questions, or a single challenge question such as the last four digits of an inmate's social security number, mother's maiden name, and the like. Authentication subsystem 216 is further configured to facilitate a secure communication between parties receiving/transmitting a communication by performing identity verifications to authenticate identities of purported parties. The identity verification includes logon verifications, such as username and password verifications, biometric verification, response to challenge questions, device verification, and/or location verification.

Security circuitry 312 also can control and manage connections between monitored conference device 300 and conference server 200. For example, security circuitry 312 establishes secure connections between monitored conference device 300 and conference server 200.

Exemplary Conference Call Management System Operation

Exemplary usage of conference call management system 100, monitored conference device 300, and generic provisioning server 300 in a controlled environment will be described with respect to FIGS. 4-8. The exemplary usage described in FIGS. 4-8 can be performed by processing logic that can comprise hardware (e.g., circuitry, dedicated logic, programmable logic, microcode, etc.), software (e.g., instructions executing on a processing device), or a combination thereof. For illustrative purposes, FIGS. 4-8 are described with respect to FIGS. 1-3 but are not limited to these example embodiments.

Figure 4:
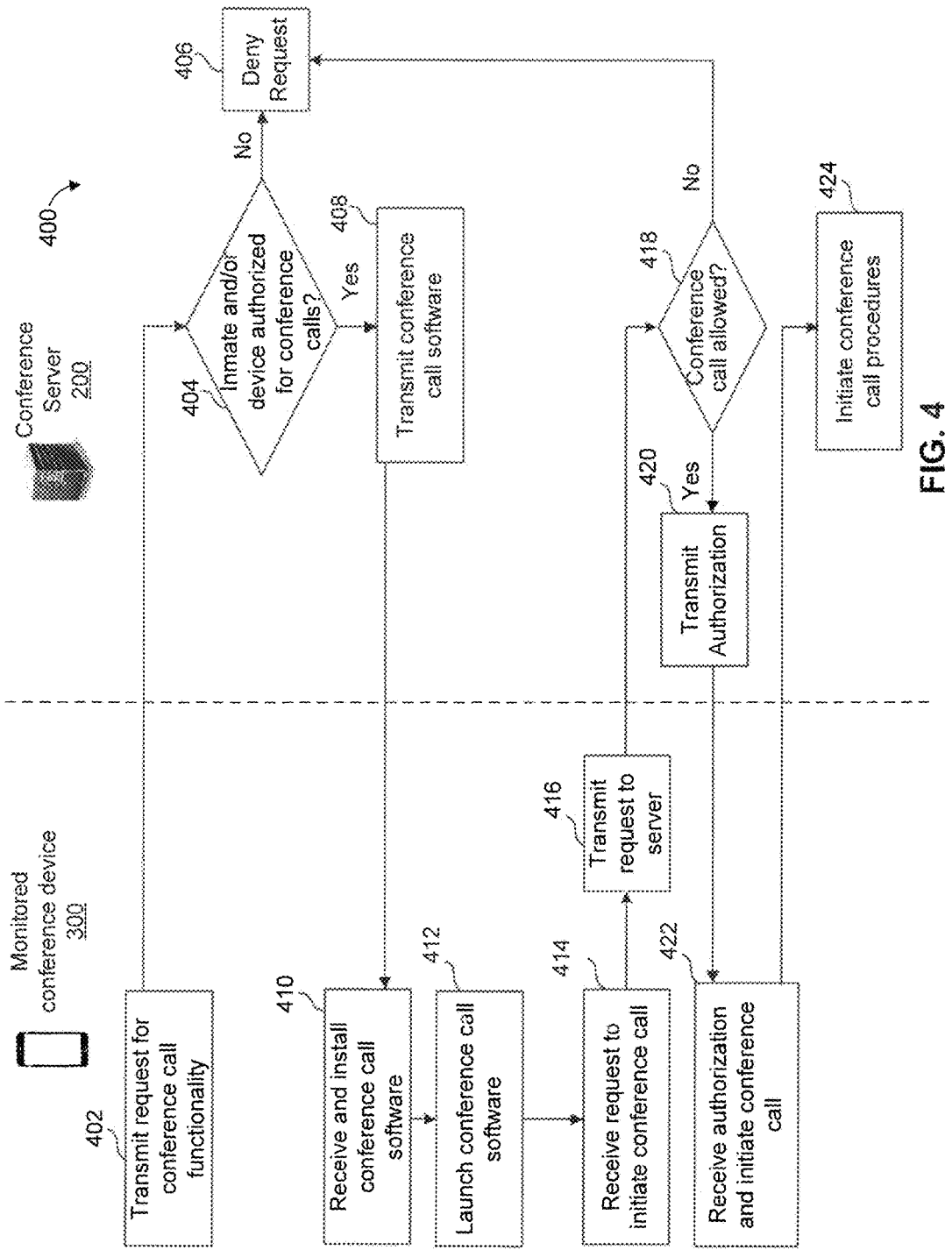
FIG. 4 illustrates a flowchart diagram of an exemplary method for installing conference call functionality on a monitored conference device of FIG. 3, according to embodiments of the present disclosure.

FIG. 4 illustrates a flowchart diagram of an exemplary method 400 for providing conference call functionality to an exemplary monitored conference device in the exemplary conference call management system of FIG. 1, according to embodiments of the present disclosure. Method 400 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 4, as will be understood by a person of ordinary skill in the art. Some steps can be combined with steps of methods from other figures and performed as a single step. Method 400 can be performed by monitored conference device 300 and conference server 200.

In 402, an inmate requests conference call functionality to be added to monitored conference device 300. As monitored conference device 300 operates within a controlled environment, monitored conference device 300 does not necessarily have conference functionality implemented for use by the inmate. For example, the controlled environment can, by default, disable all conference call functionality of monitored conference devices 110 and can require inmates to submit requests to add the conference call functionality to their respective devices. In 402, monitored conference device 300 transmits the request for conference call functionality to conference server 200. The request can include an identifier associated with the inmate and/or monitored conference device 300.

In 404, conference server 200 receives the request and determines whether conference call functionality should be added to monitored conference device 300. Conference server 200 can base the determination on the inmate making the request and/or monitored conference device 300. For example, conference server 200 can retrieve administrative rules associated with the inmate and monitored conference device 300. In some embodiments, the administrative rules dictate whether the inmate is permitted to participate in the requested conference call and whether monitored conference device 300 is permitted to participate in the requested conference call. In a non-limiting example, the request can be for a specific inmate using a smartphone and administrative rules can specify that the specific inmate is not allowed to participate in conference calls using a smart phone. If not, conference server 200 denies the request in 406. Although not shown, conference server 200 may transmit a message to monitored conference device 300 indicating that the request was denied.

If conference server 200 determines that the request should be granted (e.g., that the inmate and/or device are authorized to participate in conference calls), conference server 200 activates conference call functionality in monitored conference device 300 by transmitting conference call software to monitored conference device 300. In some embodiments, conference call software is a conference call application customized for the specific controlled environment. In 408, transmission of the conference call software can further include transmitting preferences associated with the inmate's use of the conference call functionality. For example, conference server 200 can transmit the inmate's conference PAN list if it already exists (e.g., has been previously established by inmate).

In 410, monitored conference device 300 receives and installs the conference call software. In 412, monitored conference device 300 launches the installed conference call software. For example, monitored conference device 300 can receive a request from the inmate to initiate a conference call after the conference call software has been installed. In 414, monitored conference device 300 receives a conference request to initiate the conference call. In some embodiments, the conference request is received through conference call software under the direction of the inmate. For example, conference call software can display a customized graphical user interface (GUI) and receive inputs from the inmate based on the displayed GUI. In some embodiments, conference call software can retrieve the inmate's conference PAN list from memory 308 or from conference server 200 and displays the contacts that are available to participate in a conference call with monitored conference device 300. The inmate may select contacts and the conference call software includes identifiers associated with the selected contacts into the conference request. Contacts are generally parties outside of the controlled environment. In 416, monitored conference device 300 transmits the conference request to conference server 200.

In 418, conference server 200 receives the conference request and performs another determination as to whether to allow the conference call. Conference server 200 can detect the identifiers of the inmate and the contacts and determines whether a conference call is permitted based on administrative rules associated with the inmate, the contacts, and/or monitored conference device. If not, conference server 200 denies the request at 406. If the conference call is permitted, conference server 200 transmits authorization for initiating the conference call at 420.

In 422, monitored conference device 300 receives the authorization from conference server 200 and begins procedures for establishing the conference call. Procedures can include transmitting the necessary networking information, inmate preferences for the conference call, and other settings associated with the conference call to conference server 200.

In 424, conference server 200 initiates conference call procedures as will be discussed in additional detail with regard to FIG. 6 below.

Figure 5:
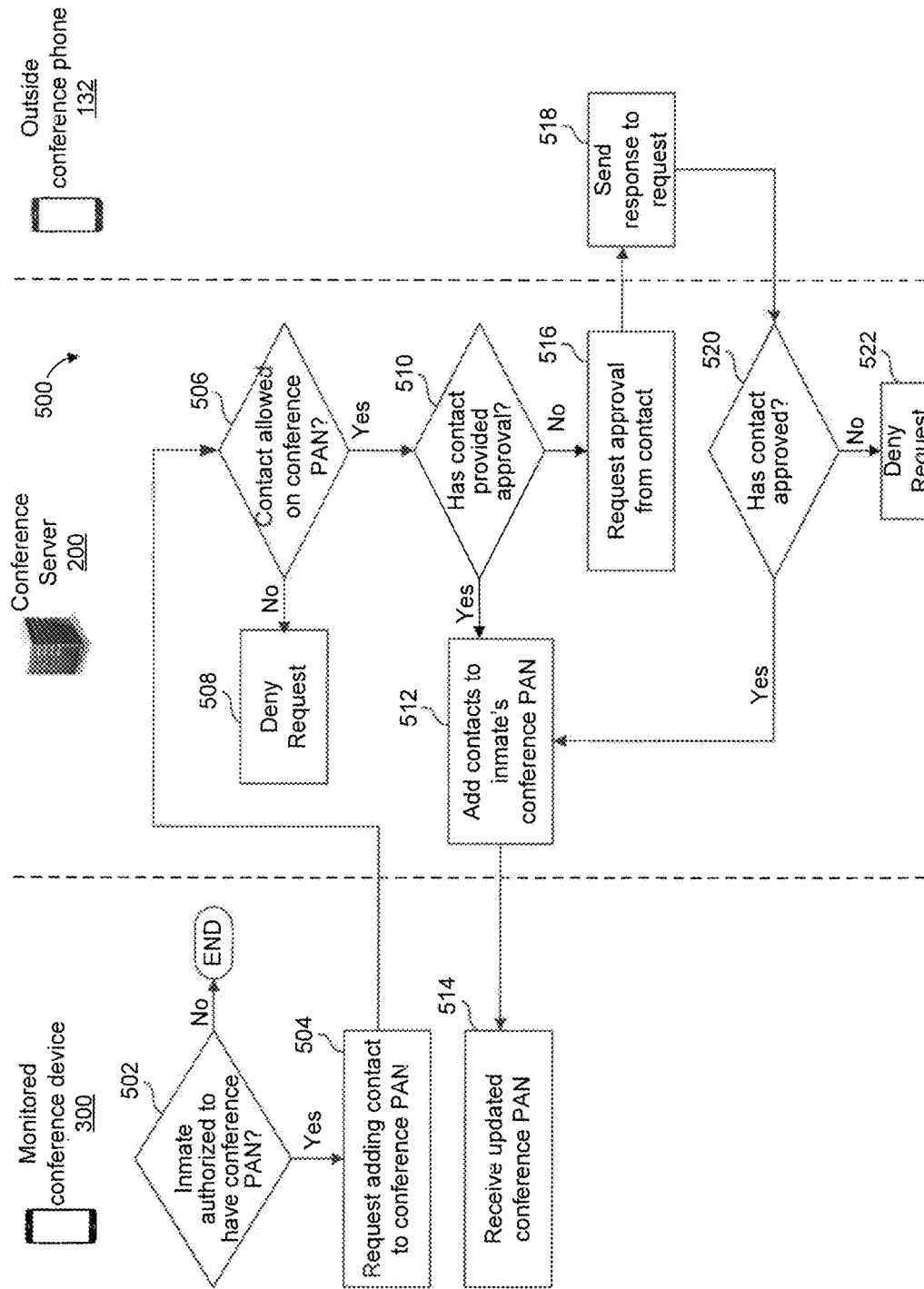
FIG. 5 illustrates a flowchart diagram of an exemplary method for updating a conference personal allowed number (PAN) list in the exemplary conference call management system of FIG. 1, according to embodiments of the present disclosure.

FIG. 5 illustrates a flowchart diagram of an exemplary method 500 for adding contacts to an inmate's conference PAN list through a monitored conference device, according to embodiments of the present disclosure. Method 500 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 5, as will be understood by a person of ordinary skill in the art. Some steps can be combined with steps of methods from other figures and performed as a single step. Method 500 can be performed by monitored conference device 300, conference server 200, and outside conference phone 132.

In 502, monitored conference device 300 receives a request from an inmate to manage the inmate's conference PAN list. Based on receiving the request, monitored conference device 300 determines whether the inmate is authorized to manage or otherwise access the conference PAN list. If not, monitored conference device 300 denies the request. In 504, if the inmate is authorized, monitored conference device 300 transmits a contact request to add a contact to the conference PAN list to conference server 200. A contact is typically a person located outside of (i.e., not incarcerated within) the controlled environment. The contact request can include an identifier associated with the contact such as the telephone number of the contact but can also include the contact's name, email address, and/or home address.

In 506, conference server 200 receives the contact request and determines, based on the identifier in the request, whether the requested contact can be added to the conference PAN list. This determination can include any number of verification steps to determine whether the contact can be added to the conference PAN list. Verification steps may include predetermined verification information. For example, conference server 200 may check a whitelist or a blacklist that includes information of contacts. If the identifier of the contact is located on the whitelist, the contact can be determined to be allowed on the conference PAN list. The predetermined verification information can be stored locally at conference server 200. Verification steps may also include real-time verification of contact information. For example, conference server 200 may submit a request to a third-party that verifies whether the contact can be added to a conference PAN list. The third-party can include a third-database or a service that provides verification information.

In 508, conference server 200 determines that the contact cannot be added to the conference PAN list and denies the contact request. In 510, conference server 200 next determines whether the contact has provided explicit approval to be added to the contact PAN list. If yes, conference server 200 updates the inmate's conference PAN list by adding the contact and transmits the updated inmate's conference PAN list to monitored conference device 300. In some embodiments, conference server 200 further determines whether the contact has previously requested not to be contacted by the inmate or previously requested to be removed from the inmate's conference PAN list. Conference server 200 would make this determination by examining a flag or marker set with respect to the contact (and its associated contact information such as telephone or email). Examples of flags that can be associated with an outside party include but are not limited to a "do not contact" flag and a "removal request" flag. A "do not contact" flag can indicate that the outside party has requested that the inmate not be allowed to contact the outside party as part of a conference call. A "removal request" flag can indicate that the outside party has previously requested that the contact information of the outside party be removed from an inmate's conference PAN list. Conference server 200 can establish different flags for conference calls or regular calls. If a contact has a "do not contact" flag or a "removal request" flag associated with its information and the requesting inmate, additional authorization would be required for the inmate to add the contact information to his conference PAN list. For example, an administrator and the contact would both need to provide approval for the inmate's request. In 514, monitored conference device 300 receives the updated conference PAN list.

In 516, conference server 200 determines that the contact has not provided approval to be added and transmits a contact approval request to the contact using the available contact information. For example, conference server 200 can attempt to call the contact at an outside conference device 130 using the contact's telephone number such as through an interactive voice response (IVR) system, send a text message to the contact, or send an email to the contact requesting the contact's approval.

In 518, outside conference device 130 receives the contact approval request and the contact is given an opportunity to provide a response either approving or denying the contact approval request. In 520, conference server 200 receives the response from outside conference device 130 and determines whether the contact has approved or denied the contact approval request. If yes, conference server 200 adds the contact to the conference PAN list and transmits the updated conference PAN list to monitored conference device 300 at 512. If the contact has denied the contact approval request, conference server denies the contact request and does not add the contact to the conference PAN list.

Figure 6:
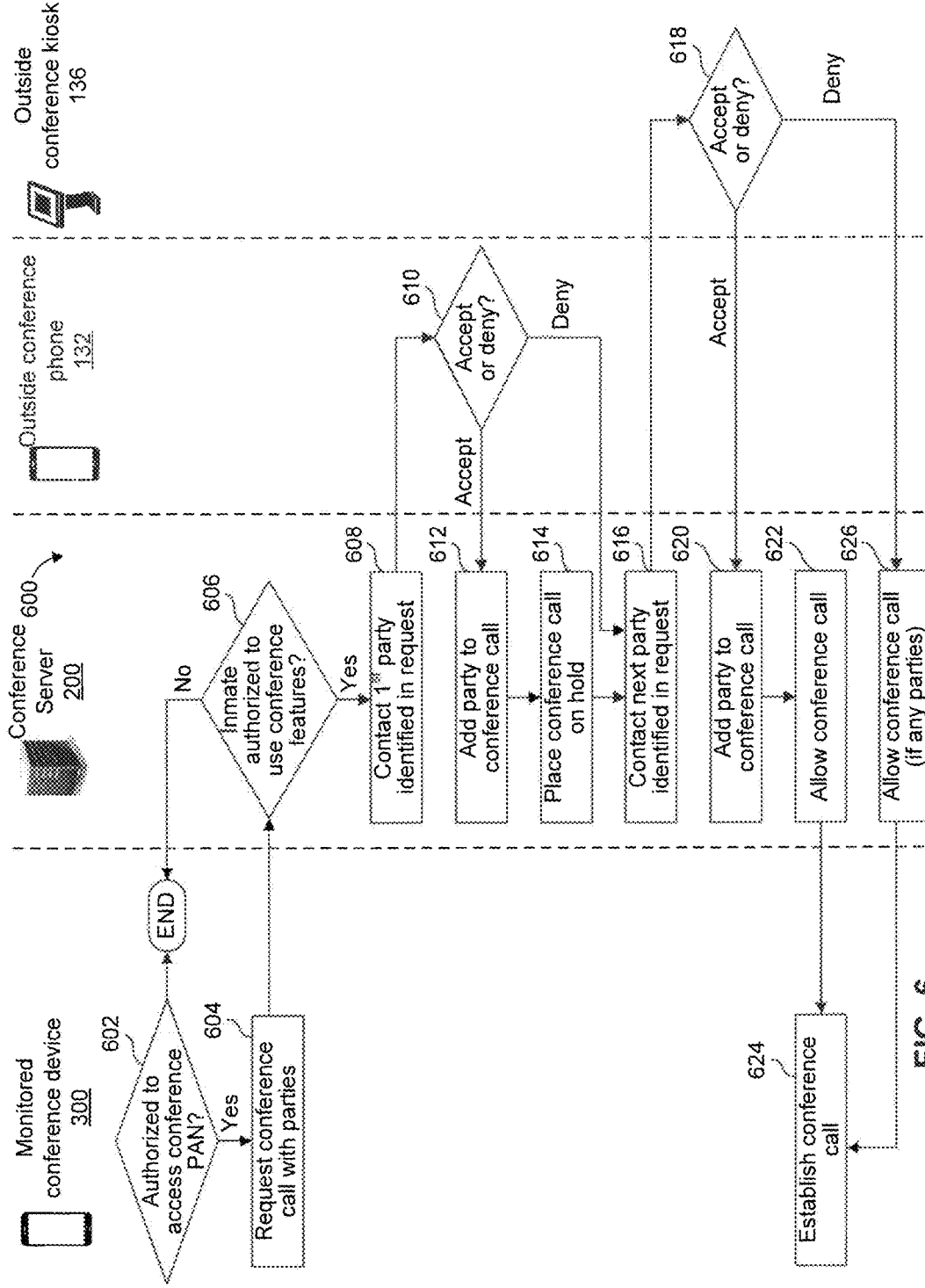
FIG. 6 illustrates a flowchart diagram of an exemplary method for initiating a conference call in the exemplary conference call management system of FIG. 1, according to embodiments of the present disclosure.

FIG. 6 illustrates a flowchart diagram of an exemplary method 600 for initiating a conference call within the exemplary conference call management system of FIG. 1, according to embodiments of the present disclosure. Method 600 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 6, as will be understood by a person of ordinary skill in the art. Some steps can be combined with steps of methods from other figures and performed as a single step. Method 600 can be performed by monitored conference device 300, conference server 200, outside conference phone 132, and outside conference kiosk 136.

In 602, monitored conference device 300 receives a request from a conference call application to add contacts to a conference call request. Monitored conference device 300 can determine whether the inmate who initiated the request through the conference call application is authorized to access the conference PAN list. If not, monitored conference device 300 denies the request. If the inmate is authorized, monitored conference device 300 generates the conference call request based on inputs provide through the conference call application. For example, in some embodiments, the conference call application displays a GUI providing the conference PAN list from which the inmate can select contacts to be included in a conference call request. Monitored conference device 300 receives the selected contacts through the conference call application and adds the selected contacts to the conference call request. In 604, the conference call application can then generate and transmit the conference call request (that includes the selected contacts from the conference PAN list) to conference server 200.

In 606, conference server 200 receives the conference call request and determines whether the inmate associated with the conference call request is authorized to participate in a conference call. Conference server 200 can make this determination by retrieving administrative rules associated with the inmate and determining whether any administrative rules permit or restrict the inmate's participation in conference calls. If not, conference server 200 denies the conference call request and the method ends. If the inmate is authorized to participate in conference calls, conference server 200 proceeds to establish the conference call based on the information provided in the conference call request.

In 608, conference server 200 contacts the first party identified in the conference call request and transmits a conference call request for the first party to join the conference call. The identification of the first party can generally be any information that can be used to contact the first party using outside conference phone 132 such as the contact's telephone number and/or email address. In 610, outside conference phone 132 receives the conference call request and transmits a response to conference server 200. In some embodiments, the response to conference server 200 includes either accepting or denying the conference call request. In some embodiments, the response includes a request from the outside party to remove the contact number from the inmate's conference PAN list. For example, the outside party may be provided the option of dialing a certain dual tone multi-frequency (DTMF) digit or code that is received by conference server 200. Conference server 200 can parse the received digit or code and determine that it corresponds to a request to remove a contact number from the inmate's conference PAN list. For example, conference server 200 can remove the last-dialed contact number for the outside party from the conference PAN list of the current inmate associated with monitored conference device 300. In other embodiments, conference server 200 can provide a link or SMS message to the contact number that allows the outside party to request removal from any conference PAN list.

If the first party accepts the conference call request, conference server 200 adds the first party to the conference call at 612. In 614, conference server 200 then places the conference call on hold and proceeds to contact the next party identified in the conference call request received from monitored conference device 300 in 616. If the first party denies the conference call request, conference server 200 proceeds directly to 616. Conference server 200 contacts the next party identified in the conference call request (from monitored conference device 300) and transmits another conference call request to the next party requesting permission to join the next party to the conference call. The identification of the next party can generally be any information that can be used to contact the next party using outside conference kiosk 136 such as the contact's telephone number and/or email address. In 618, outside conference kiosk 136 receives the conference call request and transmits a response either accepting or denying the conference call request to conference server 200.

In 620, if the first party accepts the conference call request, conference server 200 adds the next party to the conference call that may or may not already include the first party. In 622, after all parties identified in the conference call request from monitored conference device 300 have been contacted and the parties that have accepted the conference call requests have been added to the conference call, conference server 200 can call the conference call to proceed. The conference call includes monitored conference device 300 and the devices of any parties that have accepted the conference call requests transmitted by conference server 200. For example, if the party associated with outside conference phone 132 and the party associated with outside conference kiosk 136 accept the conference call request from conference server 200, then the conference call will include monitored conference device 300, outside conference phone 132, and outside conference kiosk 136.

In 624, monitored conference device 300 establishes the conference call and proceeds communicating with the parties involved in the conference call. If the next party denies the conference call request from conference server 200, then conference server proceeds to allow the conference call with any parties that have previously accepted the conference call. For example, the conference call can proceed with between monitored conference device 300 and outside conference phone 132 if the next party denies the conference call request. As another example, if the conference call request from monitored conference device 300 identified three parties and two of the three parties accept the conference call request, conference server 200 could proceed with allowing the conference call with the two parties at 626. Although only two parties and two outside conference devices are discussed with respect to FIG. 6, it is understood that such discussion is merely exemplary. A conference call, according to the present disclosure, can include any number of parties and outside conference devices which are added to the conference call consistent with the discussion above with respect to FIG. 6.

Figure 7:
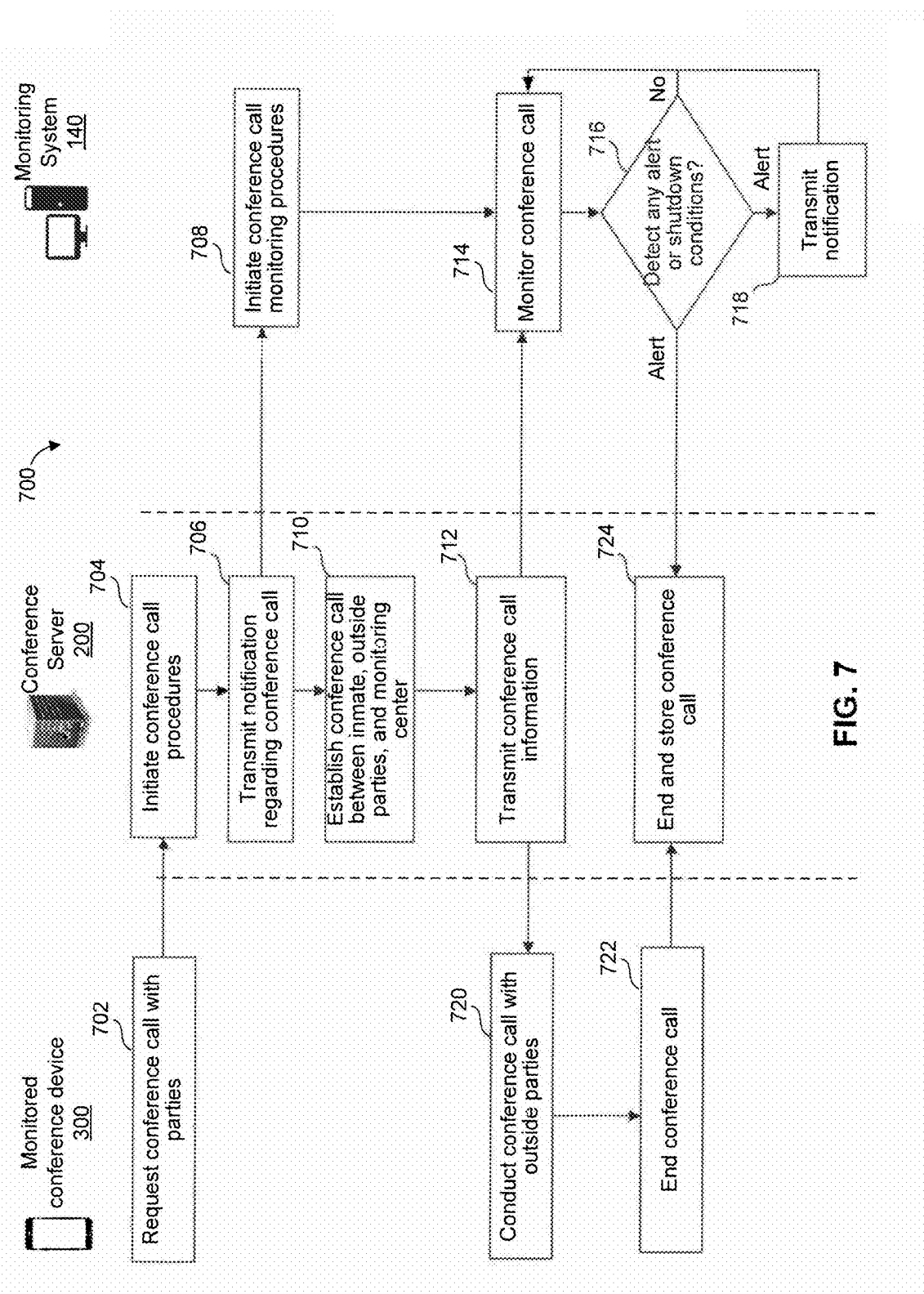
FIG. 7 illustrates a block diagram of an exemplary method for monitoring an on-going conference call in the exemplary conference call management system of FIG. 1, according to embodiments of the present disclosure.

FIG. 7 illustrates a flowchart diagram of an exemplary method 700 for performing real-time monitoring of an ongoing conference call within the exemplary conference call management system of FIG. 1, according to embodiments of the present disclosure. Method 700 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 7, as will be understood by a person of ordinary skill in the art. Some steps can be combined with steps of methods from other figures and performed as a single step. Method 700 can be performed by monitored conference device 300, conference server 200, and monitoring system 140.

In 702, monitored conference device 300 transmits a request to establish a conference call. In 704, conference server 200 initiates conference call procedures as previously discussed with respect to FIGS. 4 and 6. In 706, conference server 200 transmits a notification to monitoring system 140 that indicates a conference call is being established involving monitored conference device 300 and the inmate currently associated with monitored conference device 300. In some embodiments, when monitoring system 140 is implemented within conference server 200, conference server 200 transmits a signal to monitoring system 140. In some embodiments, when monitoring system 140 is located remotely from conference server 200, conference server 200 transmits a message over a network, such as network 103 to monitoring system 140.

In 708, monitoring system 140 receives the notification and initiates conference call monitoring procedures. In some embodiments, initiating conference call monitoring procedures includes determining whether the conference call needs to be monitored. For example, while all conference calls are recorded and stored not all conference calls require real-time monitoring. Initiating conference call monitoring procedures includes initializing a conference call analyzer, such as conference call analyzer 207 discussed with respect to FIG. 2. As previously discussed, while conference call analyzer 207 is described as a component in conference server 200, conference call analyzer 207 and its functionality can also be implemented in a different device such as in monitoring system 140.

In 710, conference server 200 establishes the requested conference call between monitored conference device 300 associated with the inmate, any outside conference devices (not shown) associated with the requested outside parties, and monitoring system 140. In some embodiments, establishing the conference call in 710 happens concurrently with monitoring system 140 initiating conference call monitoring procedures. In 712, after establishing the conference call, conference server 200 transmits a notification to the involved devices including monitored conference device 300 and monitoring system 140. The notification includes information regarding the conference call that allows the devices to join an established conference call.

In 714, monitoring center receives the notification from conference server 200 and begins monitoring the on-going conference call. Monitoring the conference call includes analyzing the conference call as discussed above with respect to conference call analyzer 207. In 716, on the basis of the analysis, monitoring system 140 determines whether there are any conditions detected during the conference call that trigger an alert or shutdown condition. Detecting of conditions includes voice analysis, biometric analysis, and object identification while the call is on-going. For example, voice analysis includes recording and detecting words or phrases spoken during the conference call; biometric analysis includes recording and detecting biometric features of the participants during the conference call; object identification includes detecting objects that are present during a video conference call. Administrative rules may be established that provide conditions when an alert or shutdown are necessary. Examples of an alert can include detecting that there is a new participant in a conference call (e.g., through voice or biometric analysis) that was not approved or identified in the conference request. In some embodiments, to insure that participants are the same throughout the conference call and to prevent unauthorized or new participants from joining the conference call, conference server 200 can maintain a log of approved participants in a conference call. Conference server 200 can generate the log based on parties identified in a conference call request received from monitored conference device 300. Examples of a shutdown condition can include detection of prohibited words or conversations during the conference call or detection of an unauthorized participant in the conference call.

In 718, if an alert condition is detected based on an administrative rule, monitoring system 140 may transmit an alert to the appropriate personnel as indicated by the administrative rule. If a shutdown condition is detected, monitoring system 140 transmits a notification to conference server 200 which ends and stores the conference call at 724.

In 720, monitored conference device 300 conducts conference call with the outside devices associated with the outside parties. In some embodiments, monitored conference device 300 and the outside devices are not aware that monitoring system 140 is part of the conference call. In 722, monitored conference device 300 can end the conference call. In 724, conference server ends and stores the conference call.

Figure 8:
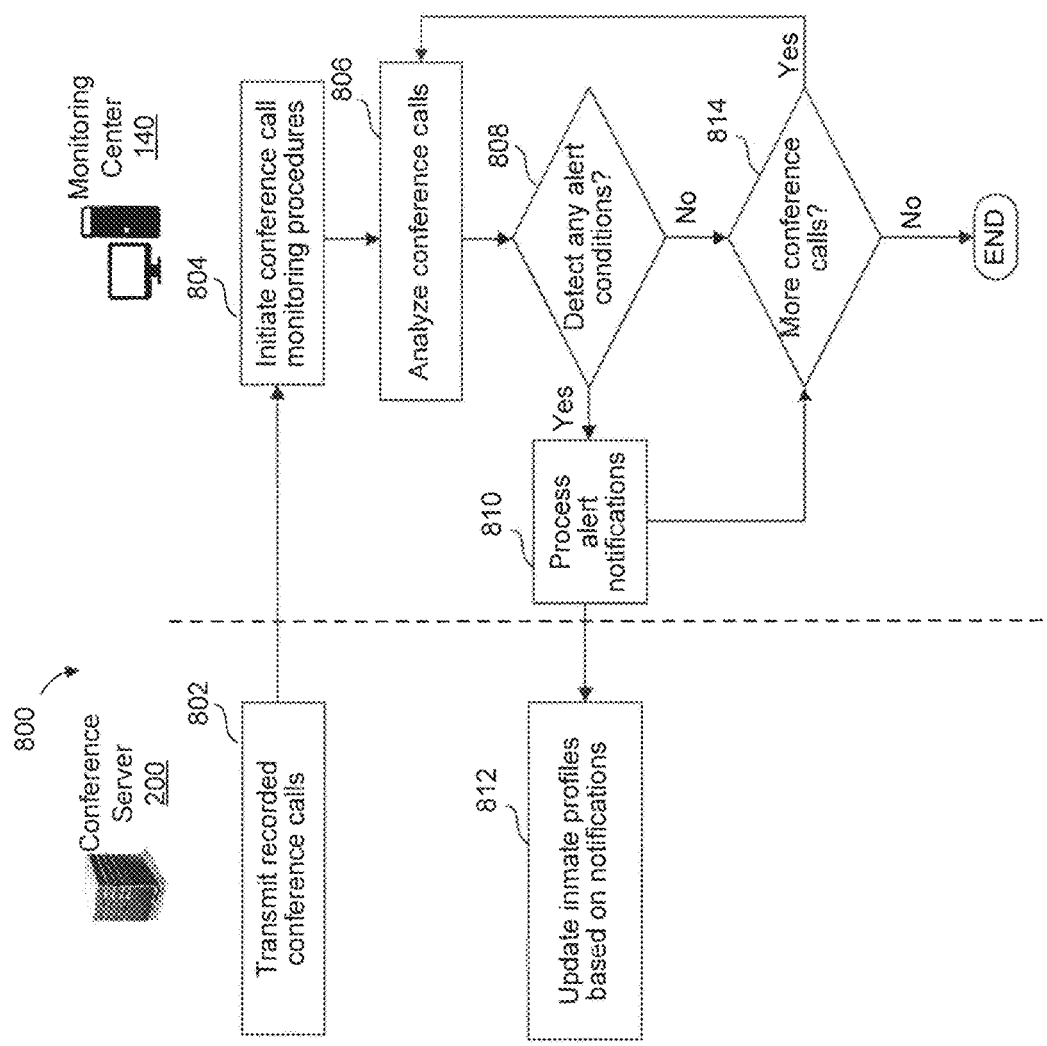
FIG. 8 illustrates a block diagram of an exemplary method for monitoring recorded conference calls in the exemplary conference call management system of FIG. 1, according to embodiments of the present disclosure.

FIG. 8 illustrates a flowchart diagram of an exemplary method 800 for performing monitoring of recorded conference call within the exemplary conference call management system of FIG. 1, according to embodiments of the present disclosure. Method 800 can be performed by processing logic that can comprise hardware (e.g., circuitry, dedicated logic, programmable logic, microcode, etc.), software (e.g., instructions executing on a processing device), or a combination thereof. It is to be appreciated that additional steps, such as additional object recognition steps, may be performed. Moreover, not all steps may be needed to perform the disclosure provided herein. Further, some of the steps may be performed simultaneously, or in a different order than shown in FIG. 8, as will be understood by a person of ordinary skill in the art. Some steps can be combined with steps of methods from other figures and performed as a single step. Method 800 can be performed by conference server 200 and monitoring system 140.

In 802, conference server 200 transmits recorded conference calls to monitoring system 140. Transmission of recorded conference calls can occur on a schedule or by request from monitoring system 140. In 804, monitoring system 140 initiates conference call monitoring procedures. Initiating conference call monitoring procedures includes initializing a conference call analyzer, such as conference call analyzer 207 discussed with respect to FIG. 2. As previously discussed, while conference call analyzer 207 is described as a component in conference server 200, conference call analyzer 207 and its functionality can also be implemented in a different device such as in monitoring system 140.

In 806, monitoring system 140 begins analyzing the conference calls. In some embodiments, the conference calls are processed by a conference call analyzer, such as conference call analyzer 207, which performs voice analysis, biometric analysis, and/or object identification on the conference call. In 808, monitoring system 140 determines whether any alert conditions have been detected. For example, administrative rules may be established that provide conditions when an alert or shutdown are necessary. Examples of an alert were discussed above with respect to FIG. 7. If there are no detected alert conditions, in 814, monitoring system 140 determines whether there are any additional conference calls to analyze.

In 810, if an alert condition is detected based on an administrative rule, monitoring system 140 may process alert notifications as indicated by the administrative rule rue and the conference server 200. In some embodiments, processing alert notifications includes transmitting notifications to the appropriate personnel. Processing alert notifications can further include generating reports regarding the participants and conference devices involved in the conference call. In 812, conference server 200 receives the notification and updates the profile of the inmate associated with the conference call in which the alert condition was detected. Updating the inmate profile can include updating the inmate's privileges with regard to the conference call functionality. For example, an administrative rule can specify that an inmate's privileges to conference call functionality be withdrawn (e.g., by uninstalling the conference call application from monitored conference device 300) if a certain alert condition is detected. As another example, conference server 200 can update the inmate's conference PAN list by removing any outside contacts associated with the detected alert condition within the conference call.

Exemplary Computer Implementation

It will be apparent to persons skilled in the relevant art(s) that various elements and features of the present disclosure, as described herein, can be implemented in hardware using analog and/or digital circuits, in software, through the execution of computer instructions by one or more general purpose or special-purpose processors, or as a combination of hardware and software.

Figure 9:
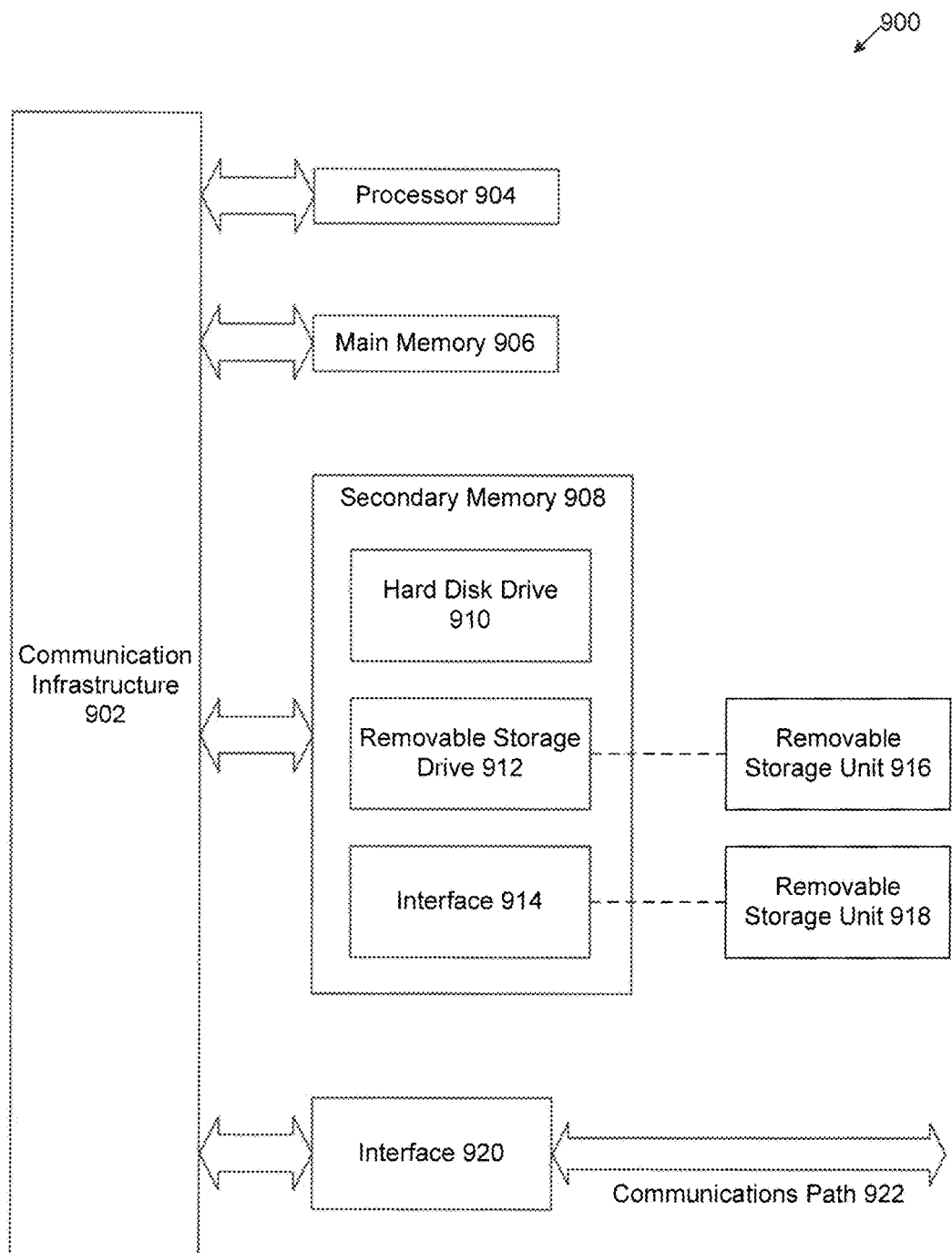
FIG. 9 illustrates a block diagram of a general purpose computer that may be used to perform various aspects of the present disclosure.

The following description of a general purpose computer system is provided for the sake of completeness. Embodiments of the present disclosure can be implemented in hardware, or as a combination of software and hardware. Consequently, embodiments of the disclosure may be implemented in the environment of a computer system or other processing system. For example, the methods of FIGS. 4-7 can be implemented in the environment of one or more computer systems or other processing systems. An example of such a computer system 900 is shown in FIG. 9. One or more of the modules depicted in the previous figures can be at least partially implemented on one or more distinct computer systems 900.

Computer system 900 includes one or more processors, such as processor 904. Processor 904 can be a special purpose or a general purpose digital signal processor. Processor 904 is connected to a communication infrastructure 902 (for example, a bus or network). Various software implementations are described in terms of this exemplary computer system. After reading this description, it will become apparent to a person skilled in the relevant art(s) how to implement the disclosure using other computer systems and/or computer architectures.

Computer system 900 also includes a main memory 906, preferably random access memory (RAM), and may also include a secondary memory 908. Secondary memory 908 may include, for example, a hard disk drive 910 and/or a removable storage drive 912, representing a floppy disk drive, a magnetic tape drive, an optical disk drive, or the like. Removable storage drive 912 reads from and/or writes to a removable storage unit 916 in a well-known manner. Removable storage unit 916 represents a floppy disk, magnetic tape, optical disk, or the like, which is read by and written to by removable storage drive 912. As will be appreciated by persons skilled in the relevant art(s), removable storage unit 916 includes a computer usable storage medium having stored therein computer software and/or data.

In alternative implementations, secondary memory 908 may include other similar means for allowing computer programs or other instructions to be loaded into computer system 900. Such means may include, for example, a removable storage unit 918 and an interface 914. Examples of such means may include a program cartridge and cartridge interface (such as that found in video game devices), a removable memory chip (such as an EPROM, or PROM) and associated socket, a thumb drive and USB port, and other removable storage units 918 and interfaces 914 which allow software and data to be transferred from removable storage unit 918 to computer system 900.

Computer system 900 may also include a communications interface 920. Communications interface 920 allows software and data to be transferred between computer system 900 and external devices. Examples of communications interface 920 may include a modem, a network interface (such as an Ethernet card), a communications port, a PCM-CIA slot and card, etc. Software and data transferred via communications interface 920 are in the form of signals which may be electronic, electromagnetic, optical, or other signals capable of being received by communications interface 920. These signals are provided to communications interface 920 via a communications path 922. Communications path 922 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 916 and 918 or a hard disk installed in hard disk drive 910. These computer program products are means for providing software to computer system 900.

Computer programs (also called computer control logic) are stored in main memory 906 and/or secondary memory 908. Computer programs may also be received via communications interface 920. Such computer programs, when executed, enable the computer system 900 to implement the present disclosure as discussed herein. In particular, the computer programs, when executed, enable processor 904 to implement the processes of the present disclosure, such as any of the methods described herein. Accordingly, such computer programs represent controllers of the computer system 900. Where the disclosure is implemented using software, the software may be stored in a computer program product and loaded into computer system 900 using removable storage drive 912, interface 914, or communications interface 920.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

It is to be appreciated that the Detailed Description section, and not the Abstract section, is intended to be used to interpret the claims. The Abstract section may set forth one or more, but not all exemplary embodiments, and thus, is not intended to limit the disclosure and the appended claims in any way.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the disclosure. Thus, the disclosure should not be limited by any of the above-described exemplary embodiments, but should be defined only in accordance with the following claims and their equivalents.

What is claimed is:

1. A method performed by a monitored conference device within a controlled environment, comprising:
  receiving a conference personal allowed number (PAN) list from a conference server, the conference PAN list being associated with a user of the monitored conference device and including a first identifier associated with a first device and a second identifier associated with a second device;
receiving a first selection including the first identifier;
receiving a second selection including the second identifier;
determining, based on an administrative rule specific to the user of the monitored conference device, whether a conference request may include at least one of the first selection or the second selection;
determining, based on a global administrative rule, whether the conference request may include at least one of the first selection or the second selection, wherein the global administrative rule is specific to any user within the controlled environment;
transmitting, responsive to the determining based on the administrative rule and the determining based on the global administrative rule, the conference request for a conference call involving the monitored conference device, the first device, and the second device to the conference server, the conference request including the first selection and the second selection;
receiving an indication from the conference server that the conference call is permitted to be established; and
establishing the conference call based on the indication.

2. The method of claim 1, wherein the first device and the second device are located outside of the controlled environment.

3. The method of claim 1, further comprising:
transmitting, to the conference server, a contact request for adding an outside identifier to the conference PAN list, wherein the contact request identifies an outside party.

4. The method of claim 3, further comprising:
receiving an updated conference PAN list from the conference server, wherein the updated conference PAN list includes the outside identifier.

5. The method of claim 1, further comprising:
transmitting, to the conference server, an authorization request to add a conference call function to the monitored conference device;
receiving, from the conference server, a conference call application based on the authorization request; and
adding the conference call function by installing the conference call application.

6. The method of claim 5, further comprising:
initiating the conference call application, wherein the initiating includes accessing the conference PAN list.

7. The method of claim 5, further comprising:
receiving, from the conference call application, a selection to establish the conference call prior to submitting the conference request.

8. The method of claim 1, wherein the conference PAN list is a subset of a PAN list associated with the user of the monitored conference device.

9. The method of claim 1, further comprising:
determining, based on a second administrative rule specific to a group of users that includes the user, whether the conference request may include at least one of the first selection or the second selection,
wherein the group of users represents a subset of all users in the controlled environment,
wherein transmitting the indication is further responsive to the determining based on the administrative rule, the determining based on the second administrative rule, and the determining based on the global administrative rule to the monitored conference device.

10. The method of claim 1, further comprising:
determining, based on a second administrative rule specific to the monitored conference device, whether the conference request may include an identifier of the monitored conference device, wherein transmitting the indication is further responsive to the determining based on the administrative rule, the determining based on the second administrative rule, and the determining based on the global administrative rule to the monitored conference device.

11. A monitored conference device for operating within a controlled environment, comprising:
a memory; and
a processor coupled to the memory, the processor configured to:
transmit, to a conference server, an authorization request to add a conference call function to the monitored conference device;
receive, from the conference server, a conference call application based on the authorization request;
add the conference call function by installing the conference call application;
initiate the conference call application, the conference call application configured to have access to a conference personal allowed number (PAN) list;
receive, from the conference call application, a first selection including a first identifier;
receive, from the conference call application, a second selection including a second identifier;
determine, based on an administrative rule specific to a user of the monitored conference device, whether a conference request may include at least one of the first selection or the second selection;
determine, based on a global administrative rule, whether the conference request may include at least one of the first selection or the second selection, wherein the global administrative rule is specific to any user within the controlled environment;
transmit, responsive to the determining based on the administrative rule and the determining based on the global administrative rule to the conference server, the conference request for a conference call involving the monitored conference device, a first device, and a second device, wherein the conference request includes the first selection and the second selection;
receive an indication from the conference server that the conference call is permitted to be established; and
establish the conference call based on the indication.

12. The monitored conference device of claim 11, wherein the processor is further configured to:
communicate with the first device associated with a first party and the second device associated with a second party, wherein the first party and the second party are located outside of the controlled environment.

13. The monitored conference device of claim 11, wherein the processor is further configured to:
receive the conference PAN list from the conference server, wherein the conference PAN list includes the first identifier associated with the first device and the second identifier associated with the second device and the conference PAN list is associated with the user of the monitored conference device.

14. The monitored conference device of claim 11, wherein the processor is further configured to:

transmit, to the conference server, a contact request for adding an outside identifier to the conference PAN list, wherein the contact request identifies an outside party.

15. The monitored conference device of claim 14, wherein the processor is further configured to:
receive an updated conference PAN list from the conference server, wherein the updated conference PAN list includes the outside identifier.

16. The monitored conference device of claim 11, wherein the processor is further configured to:
receive, from the conference call application, a selection to establish the conference call prior to submitting the conference request.

17. The monitored conference device of claim 11, wherein the conference PAN list is a subset of a PAN list associated with the user of the monitored conference device.

18. A method for establishing a conference call by a conference server, comprising:
receiving, from a monitored conference device, a list request to add a first identifier and a second identifier to a conference personal allowed number (PAN) list, the conference PAN list being associated with a user of the monitored conference device;
determining whether the user of the monitored conference device is authorized to access the conference PAN list;
based on the determining, updating the conference PAN list based on the first identifier and the second identifier;
transmitting, to the monitored conference device, the conference PAN list, wherein the conference PAN list includes the first identifier associated with a first device and the second identifier associated with a second device;
receiving, from the monitored conference device, a conference request for the conference call involving the monitored conference device, the first device, and the second device, the conference request including the first identifier and the second identifier;
determining, based on an administrative rule specific to the user of the monitored conference device, whether the conference call is permitted to be established based on at least one of a first selection or a second selection;
determining, based on a global administrative rule, whether the conference call is permitted to be established based on the at least one of the first selection or the second selection, wherein the global administrative rule is specific to any user within the controlled environment;
transmitting, responsive to the determining based on the administrative rule and the determining based on the global administrative rule to the monitored conference device, an indication that the conference call is permitted to be established; and
establishing the conference call.

19. The method of claim 18, further comprising:
transmitting, to the conference server, an authorization request to add a conference call function to the monitored conference device; and
receiving, from the conference server, a conference call application based on the authorization request.

20. The method of claim 18, further comprising:
transmitting information associated with the conference call to a monitoring center.

21. The method of claim 20, further comprising:
receiving, from the monitoring center, an instruction to terminate the conference call.

22. The method of claim 18, further comprising:
transmitting a first confirmation request to the first device based on the list request; and
transmitting a second confirmation request to the second device based on the list request.

* * * * *